(12) United States Patent
Wang et al.

(10) Patent No.: US 11,153,232 B2
(45) Date of Patent: Oct. 19, 2021

(54) METHOD, DEVICE AND COMPUTER PROGRAM PRODUCT FOR BACKING UP DATA

(71) Applicant: EMC IP Holding Company LLC, Hopkinton, MA (US)

(72) Inventors: Yi Wang, Chengdu (CN); Qianyun Cheng, Chengdu (CN); Jingrong Zhao, Chengdu (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/798,227

(22) Filed: Feb. 21, 2020

(65) Prior Publication Data
US 2021/0119942 A1    Apr. 22, 2021

(30) Foreign Application Priority Data
Oct. 17, 2019    (CN) .......................... 201910992445.5

(51) Int. Cl.
*H04L 12/861* (2013.01)
*H04L 12/26* (2006.01)
*H04L 29/06* (2006.01)

(52) U.S. Cl.
CPC .............. *H04L 49/90* (2013.01); *H04L 43/08* (2013.01); *H04L 67/42* (2013.01)

(58) Field of Classification Search
CPC .......... H04L 49/90; H04L 67/42; H04L 43/08
USPC ......................................................... 709/203
See application file for complete search history.

(56) References Cited

U.S. PATENT DOCUMENTS

| 5,938,734 | A | * | 8/1999 | Yao | ..................... | H04N 21/2326 |
| | | | | | | 348/E5.008 |
| 2009/0310663 | A1 | * | 12/2009 | Menon | .................... | H04L 69/14 |
| | | | | | | 375/225 |

* cited by examiner

*Primary Examiner* — Tu T Nguyen
(74) *Attorney, Agent, or Firm* — Womble Bond Dickinson (US) LLP

(57) ABSTRACT

According to example embodiments of the present disclosure, provided is a method, device and computer program product for backing up data. The method comprises: determining a first number of data streams for sending target data; causing the target data to be sent to a buffer via the first number of data streams; determining a second number of data streams for sending the target data from the buffer to a server based on a transmission parameter associated with transmission of the target data to the buffer and a capability of the server for receiving data from the buffer; and causing the target data to be sent from the buffer to the server via the second number of data streams. Thereby, the present solution can improve the performance of sending data in a backup client.

20 Claims, 7 Drawing Sheets

METHOD, DEVICE AND COMPUTER PROGRAM PRODUCT FOR BACKING UP DATA

CROSS-REFERENCE TO RELATED APPLICATION

This patent application claims priority, under 35 U.S.C. § 119, of Chinese Patent Application No. 201910992445.5, filed Oct. 17, 2019, which is incorporated by reference herein in its entirety.

FIELD

Embodiments of the present disclosure generally relate to a method, device and computer program product for backing up data.

BACKGROUND

In a backup system, it is necessary to send a lot of backup data from a backup client to a backup server. To improve the performance of sending data from the backup client to the backup server, multiple data streams need to be used to send backup data simultaneously.

In a traditional backup system, usually the fixed number of data streams for sending data is set independently based on experimental data. However, such a method cannot be flexibly applied to different types and sizes of data. For example, for backup data with a high duplication rate, the actual data that needs to be sent is actually very small, and too many data streams will bring unnecessary context switches. This will take many resources while impacting the backup job performance on a backup server. For large data, too few data streams might slow down the data transmission. In addition, in a backup server, the maximum number of data streams is usually set. If a sum of data streams from a plurality of clients reaches the maximum number, then the backup server might not work with best performance to process those multiple data streams.

SUMMARY

Embodiments of the present disclosure provide a method, device and computer program product for backing up data.

In a first aspect of the present disclosure, a method for backing up data is provided. The method comprises: determining a first number of data streams for sending target data; causing the target data to be sent to a buffer via the first number of data streams; determining a second number of data streams for sending the target data from the buffer to a server based on a transmission parameter associated with transmission of the target data to the buffer and a capability of the server for receiving data from the buffer; and causing the target data to be sent from the buffer to the server via the second number of data streams.

In a second aspect of the present disclosure, a device for backing data is provided. The device comprises at least one processing unit and at least one memory. The at least one memory is coupled to the at least one processing unit and stores instructions to be executed by the at least one processing unit. The instructions, when executed by the at least one processing unit, cause the device to perform action, including: determining a first number of data streams for sending target data; causing the target data to be sent to a buffer via the first number of data streams; determining a second number of data streams for sending the target data from the buffer to a server based on a transmission parameter associated with transmission of the target data to the buffer and a capability of the server for receiving data from the buffer; and causing the target data to be sent from the buffer to the server via the second number of data streams.

In a third aspect of the present disclosure, a computer program product is provided. The computer program product is tangibly stored on a non-transitory computer readable-medium and comprises machine-executable instructions which, when executed, cause a machine to perform any step of a method described according to the first aspect of the present disclosure.

The Summary is provided in order to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

Figure 1:
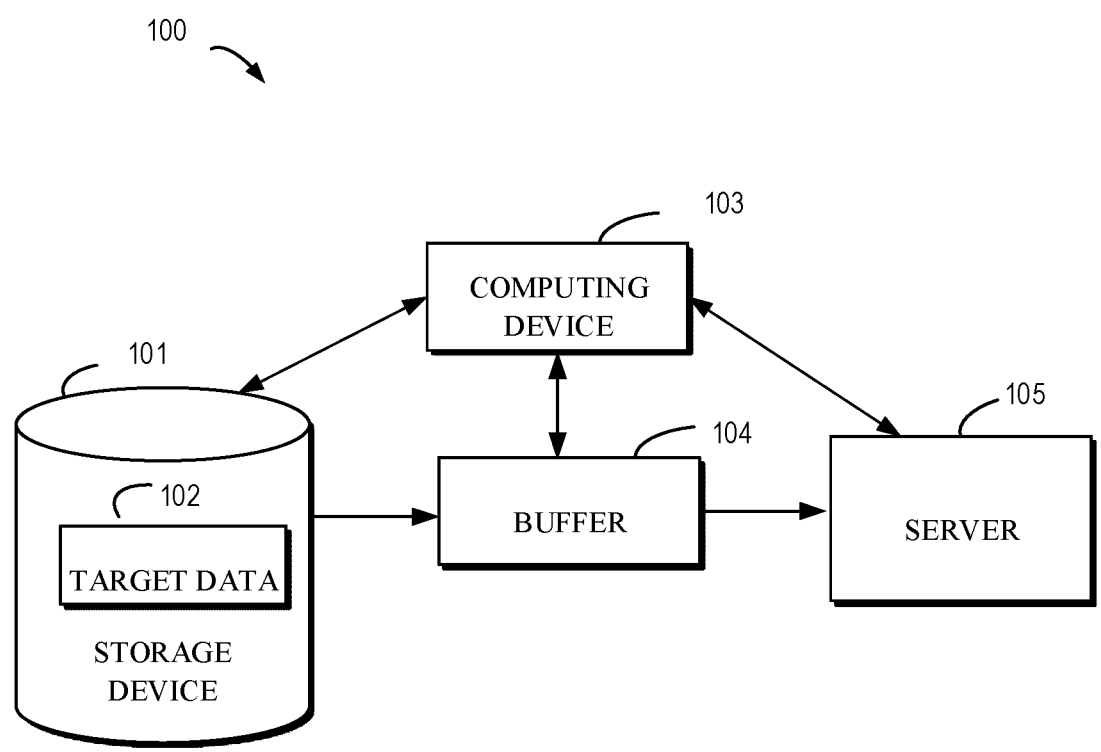
FIG. 1 shows a schematic view of a backup system according to embodiments of the present disclosure.

Throughout the figures, the same or corresponding reference signs refers to the same or corresponding portion.

DETAILED DESCRIPTION OF EMBODIMENTS

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Traditionally, clients usually utilize a fixed number of data streams for backing up different types and sizes of data to a server. However, using the fixed number of data streams with respect to different data and in different working periods of the server often fails to maximize the best performance of the client and server, and causes a waste of resources and impacts the backup speed. Specifically, the following three scenarios may exist.

In a first scenario, for backup data with a high duplication data rate, there is not much new data needs to be sent from the backup client to the backup server. In this scenario, too many data streams might bring a lot of unnecessary context switches in the backup server to process messages from different streams. This will impact the backup job performance on the backup server, and data transmission does not reach the bottleneck.

In a second scenario, for backup data with a low duplication data rate, more new data needs to be sent to the backup server. In this scenario, there is a need for more streams to send data simultaneously to make the data transmission faster. If a small fixed number is set for data streams, then the data transmission might not be fast enough.

In a third scenario, in the backup server, a maximum number is usually set which may be connected to the client. If the maximum number is reached by streams as described in the above first and second scenarios, the backup server may not work at the best performance to process these data streams.

To at least partly solve the above problem and one or more of other potential problems, example embodiments of the present disclosure propose a solution for backing up data. In the solution, a first number of data streams for sending target data is determined. Then, the target data is sent to a buffer via the first number of data streams.

A second number of data streams for sending the target data from the buffer to a server is determined based on a transmission parameter related to sending the target data to the buffer and a capability of the server for receiving data from the buffer. Specifically, a data amount sent to the buffer per second and an average data amount which data streams of the server may receive per second may be obtained for determining the second number. Finally, the target data is caused to be sent from the buffer to the server via the second number of data streams.

In this way, the present solution may accurately assign the number of data streams for sending data in each backup client where attributes of data and a working state of the server are analyzed. Thereby, unnecessary data streams do not need to be set to process data with a higher duplication rate, while more data streams may be set to process data with a low duplication rate. Moreover, the performance of sending performance in the backup client is improved.

Specific examples of the present disclosure will be described in more detail with reference to FIGS. 1 to 7. FIG. 1 shows a schematic view of an example of a backup system 100 according to embodiments of the present disclosure. As depicted, the backup system 100 comprises a storage device 101, a computing device 103, a buffer 104 and a server 105. The computing device 103 may comprise, but not limited to a cloud computing device, mainframe, personal computer, desktop computer, laptop computer, tablet computer, personal digital assistant and any other device with computation capability. The storage device 101 may comprise a cloud storage device, magnetic storage device, optical storage device and any other physical or virtual storage device with storage capability. Target data 102 to be backed up is stored in the storage device 101.

The computing device 103 may determine a first number of data streams for sending the target data 102. Specifically, the computing device 103 may communicate with the storage device 101 to obtain an impacting factor associated with the target data 102. The impacting factor may be, for example, an average data duplication rate in historical backups, a data increasing or decreasing rate in recent (e.g., in 1 month) backups, the size of the target data 102, the type of the target data 102, etc.

The computing device 103 then calculates the number of data streams based on the obtained impacting factor associated with the target data 102, so as to meet a desired transmission parameter. In the present disclosure, the desired transmission parameter may be a transmission parameter that meets SLA (Service Level Agreement) or meets SLA plus some overheads. The transmission parameter may be, for example, the speed of sending the target data 102, an average bandwidth of data streams for sending the target data 102, a packet loss rate of sending the target data 102, etc.

Next, the computing device 103 causes the target data 102 to be sent to the buffer 104 via the first number of data streams. For example, the computing device 103 notifies the buffer 104 of the determined first number so as to be used for sending the target data 102. The buffer 104 may be an input buffer, output buffer or input and output buffer.

Thereby, the number of data streams may be set dynamically according to the target data 102 to be backed up. In this way, data to be backed up may be prepared as soon possible, and the data processing will not become a bottleneck.

In some embodiments, the computing device 103 may preprocess raw data in the storage device 101 so as to obtain the target data 102. The preprocessing may be, for example, to delete data in the raw data which is the same as data existing in the server 105.

Then, the computing device 103 may determine a second number for data streams for sending the target data 102 from the buffer 104 to the server 105 based on the transmission parameter associated with transmission of the target data 102 to the buffer 104 and a capability of the server 105 for receiving data from the buffer 104. For example, the computing device 103 may obtain through the buffer 104 a data amount reaching the buffer per second, then obtain from the server a current working state of the server 105 so as to calculate a data amount which each data stream in the server may receive, thereby dividing the two data amounts to obtain the second number.

Finally, the computing device 103 causes the target data 102 to be sent from the buffer 104 to the server 105 via the second number of data streams. Similarly, the computing device 103 notifies the server 106 of the determined second number so as to be used for sending the target data 102.

Thereby, the computing device 103 determines the required number of data streams by considering the capability of the server 105 for receiving data and data which the buffer 104 actually accepts, therefore causing the server 105 to work at the best performance, and the performance of sending data in the backup client is improved.

Figure 2:
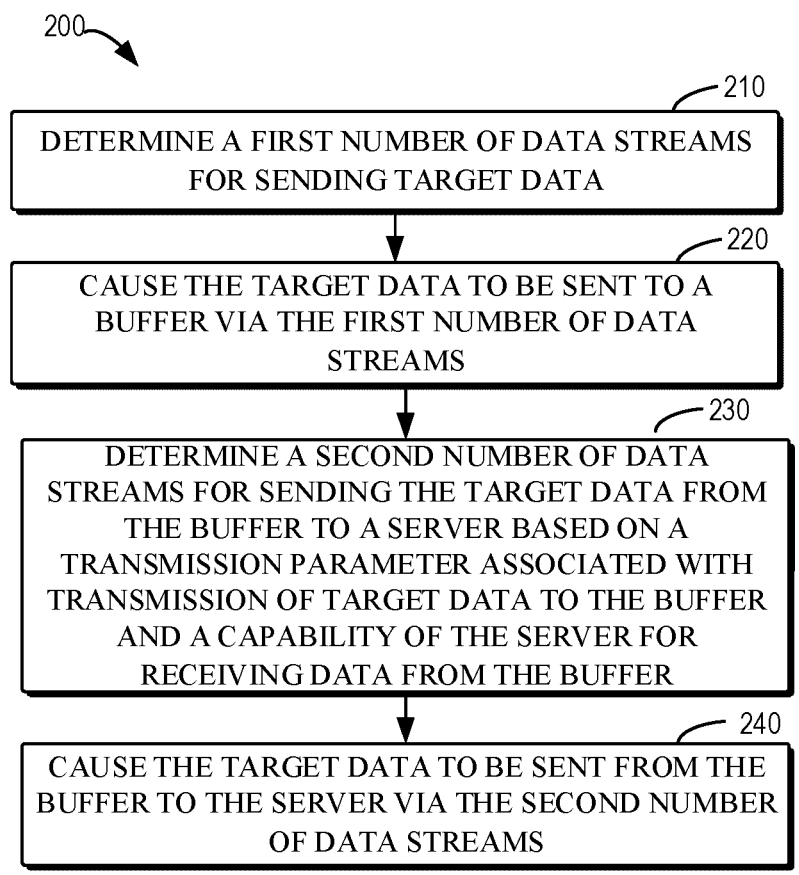
FIG. 2 shows a flowchart of a method for backing up data according to embodiments of the present disclosure.

FIG. 2 shows a flowchart of a method 200 for backing up data according to embodiments of the present disclosure. For example, the method 200 may be performed by the computing device 103 as shown in FIG. 1. It should be understood the method 200 may further comprise an additional step which is not shown and/or may omit a step which is shown, and the scope of the present disclosure is not limited in this regard.

At 210, the computing device 103 determines a first number of data streams for sending the target data 102. For example, the computing device 103 may communicate with the storage device 101 to obtain an impacting factor associated with the target data 102. The impacting factor may be, for example, an average data duplication rate in historical backups, a data increasing or decreasing rate in recent (e.g., in 1 month) backups, the size of the target data 102, the type of the target data 102, etc.

Figure 3:
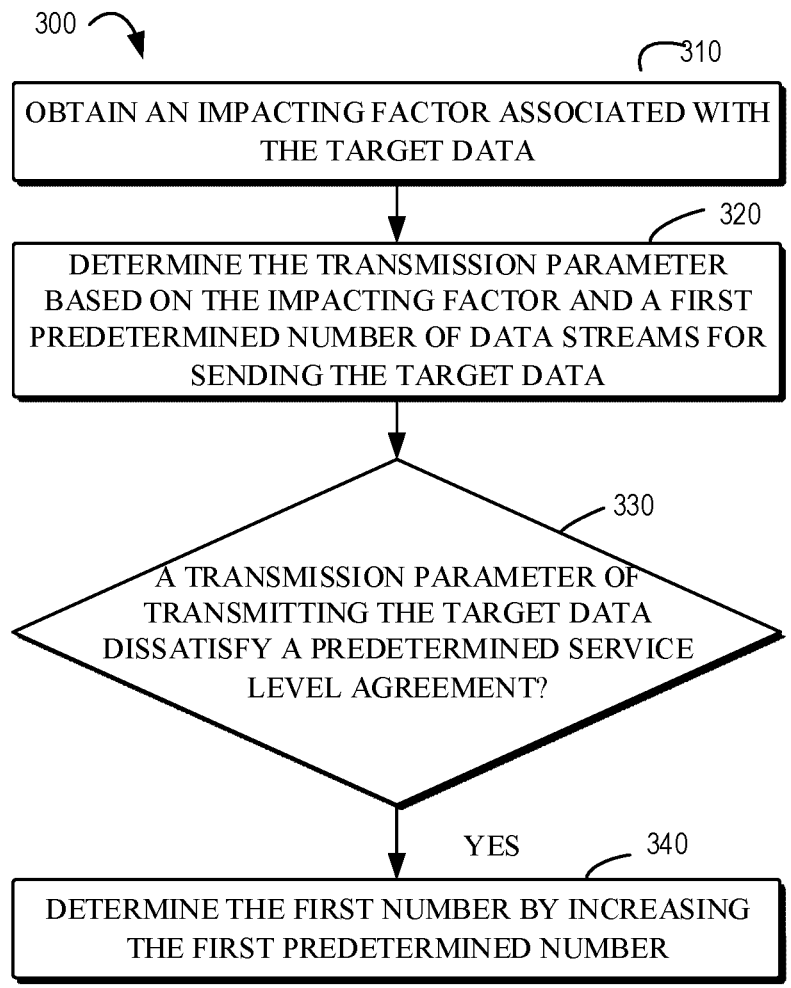
FIG. 3 shows a flowchart of a method for determining a first number according to embodiments of the present disclosure.

A method 300 for determining the first number may be further described in conjunction with FIG. 3. For example, the method 300 may be performed by the computing device 103 as shown in FIG. 1. It should be understood the method 300 may further comprise an additional step which is not shown and/or may omit a step which is shown, and the scope of the present disclosure is not limited in this regard.

At 310, the computing device 103 obtains an impacting factor associated with the target data 102. The computing device 103 may access target data in the storage device 101 to obtain the impacting factor of the target data 102 and notify a machine learning module 501 as shown in FIG. 5 of the obtained impacting factor for further calculation.

Figure 5:
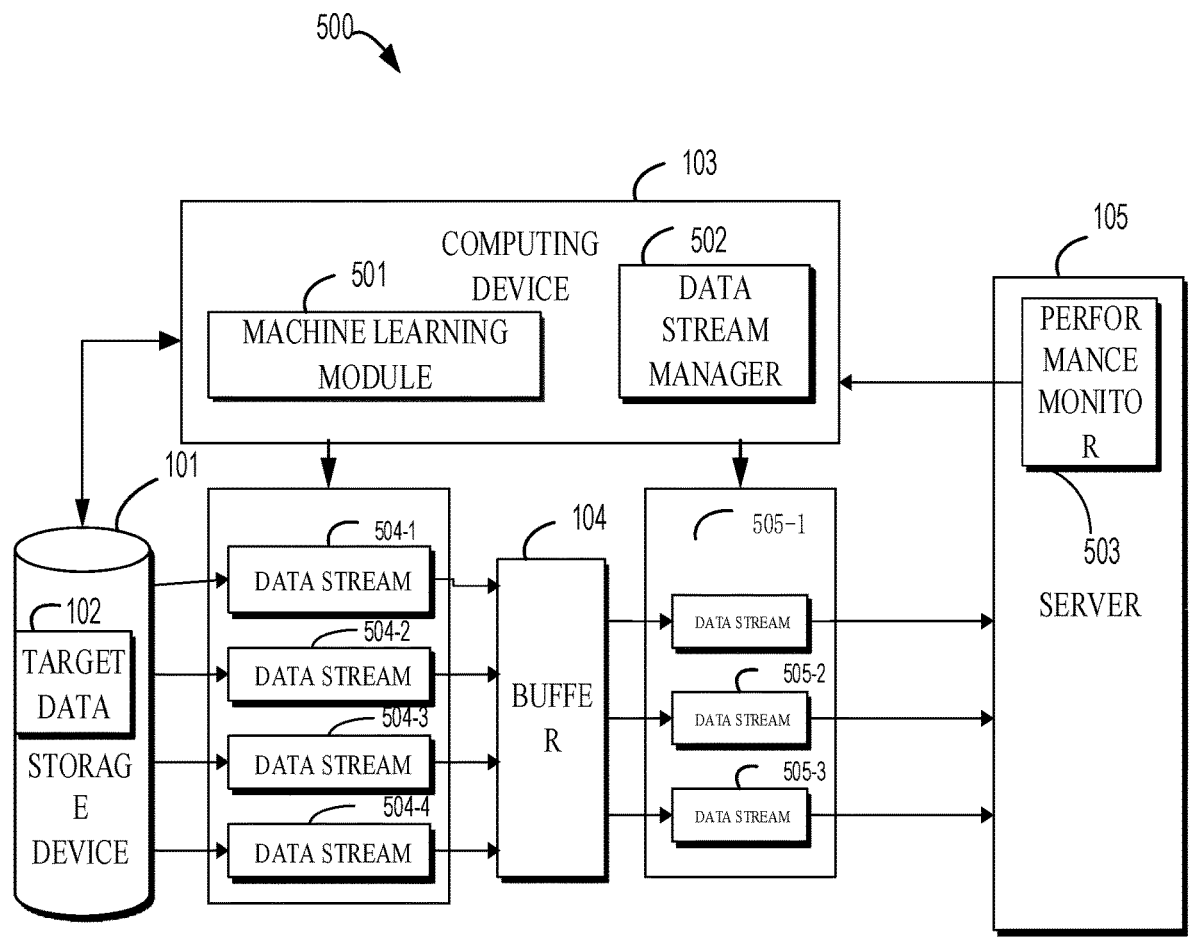
FIG. 5 shows a schematic view of a backup system according to other embodiments of the present disclosure.

It should be noted that although the computing device 103 shown in FIG. 5 comprises the machine learning module 501 and a data stream manager 502, the present disclosure is not intended to limit specific modules in the computing device 103, functions similar to those of the machine learning module 501 and the data stream manager 502 may be performed by other proper software or hardware.

In some embodiments, the impacting factor may be one of an average historical data duplication rate, a data increasing or decreasing rate and the size data, for example, may be a data duplication rate of backup operations in one month, data increasing or decreasing rate of backup operations in one week. The above three will be taken as examples for illustration below, but this is not intended to limit the scope of the present disclosure.

At 320, the computing device 103 determines a transmission parameter based on the impacting factor and a first predetermined number of data streams for sending the target data 102. The computing device 103 calculates the transmission parameter of sending the target data from the storage device 101 to the buffer 104 by using the machine learning module 501.

The transmission parameter is an indicator related to data transmission, such as the speed of sending the target data 102, the average bandwidth of data streams for sending the target data 102, a packet loss rate of sending the target data 102, operating time of the buffer 104, etc.

In some embodiments, the computing device may set the first number of data streams to a smaller value, e.g., 2. Then, the computing device 103 calculates a transmission parameter with the above three impacting factors, a corresponding weight matrix and the first predetermined number 2 by using the machine learning module 501, and compares the calculated transmission parameter with a transmission parameter required by a predetermined service level agreement. Here, the required transmission parameter may be determined according to SLA (Service Level Agreement) plus some overhead performance. The overhead performance is used to reserve time for processing logic during pipeline with data sending session. The calculation of the transmission parameter and weight matrix will be described in detail with reference to FIG. 6 below.

At 330, the computing device 103 judges whether the transmission parameter of sending the target data 102 meets a predetermined service level agreement. For example, the predetermined service level agreement requires the transmission speed is 1 MB/S or the packet loss rate is less than 1%, etc.

At 340, in response to the transmission parameter of the target data 102 to be sent dissatisfying the predetermined service level agreement, the computing device 103 determines the first number by increasing the first predetermined number. For example, if the calculated transmission parameter indicates the transmission speed is 0.8 MB/S, then the first predetermined number 2 is increased by 1 to recalculate the transmission parameter, until the transmission speed meets 1 MB/S. Note the increase by 1 at a time is merely for illustration and not intended to limit the scope of the present disclosure.

In one alternative embodiment, the computing device 103 may further directly determine the first number of data streams by matching the target data 102 with similar historical target data.

Returning to FIG. 2, at 220, the computing device 103 causes the target data 102 to be sent to the buffer 104 via the first number of data streams. For example, the computing device 103 notifies the buffer 104 with the determined first number for sending the target data 102. The computing device 103 may traverse the target data 102 and then divide the target data 102 into the first number of data blocks for transmission. As shown in FIG. 5, the target data 102 is sent via 4 data streams 504-1, 504-2, 504-3 and 504-4 (referred to as a data stream 504 below). The specific process of data transmission is not described here, but data may be sent by any technique that is already known in the art or to be developed in future.

In some embodiments, the computing device 103 may determine incremental data in the raw data which is different from existing data in the server 105, based on the impacting factor associated with the raw data, and may determine the incremental data with the target data 102 for subsequent backup.

At 230, the computing device 103 determines a second number for data streams for sending the target data from the buffer 104 to the server 105 based on the transmission parameter associated with transmission of the target data 102 to the buffer 104 and a capability of the server 105 for receiving data from the buffer 104.

Here, the capability of the server 105 for receiving data comprises the maximum number of data streams which the server 105 can receive, the average bandwidth of data streams received by the server 105, the speed of the server 105 receiving data streams, a load of the server 105, and operating time of the server 105.

In one embodiment, as shown in FIG. 5, the computing device 103 may monitor the above capability via a performance monitoring module 503 and send a monitoring result to the data stream management module 502. The performance monitoring module 503 may be arranged inside or outside the server 105.

Figure 4:
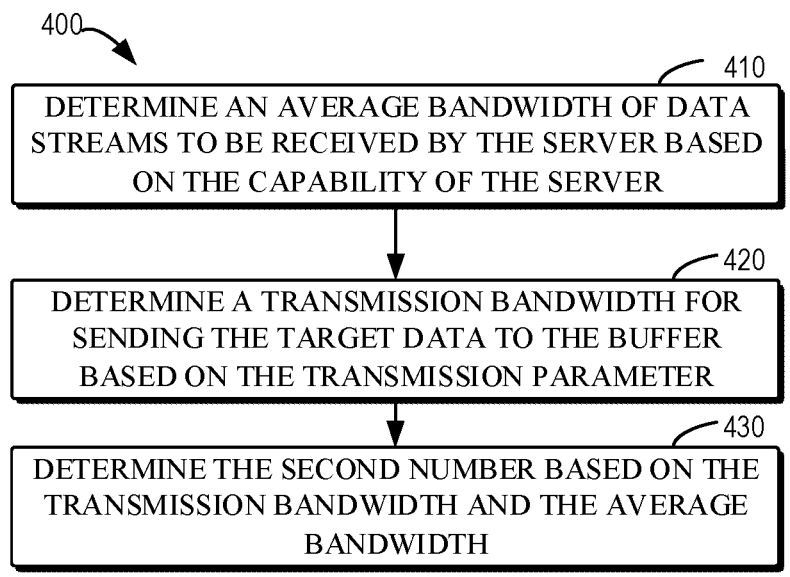
FIG. 4 shows a schematic view of a method for determining a second number according to embodiments of the present disclosure.

A method 400 for determining the second number will be further described in conjunction with FIG. 4. For example, the method 400 may be performed by the computing device 103 as shown in FIG. 1. It should be understood the method 400 may further comprise an additional step which is not shown and/or may omit a step which is shown, and the scope of the present disclosure is not limited in this regard.

At 410, the computing device 103 determines the average bandwidth of data streams to be received by the server based on the capability of the server 105. In the server 105, different jobs run at different times, so the performance of the average bandwidth of data streams to be received by the server 105 might vary. For example, if the backup server has a high workload, then the bandwidth of each data stream sending data may be reduced.

At 420, the computing device 103 determines the transmission bandwidth for sending the target data 102 to the buffer 104 based on the transmission parameter. For example, the computing device 103 may obtain from the buffer 104 the transmission bandwidth taken by data sent to the buffer 104 at 220.

At 430, the computing device 103 determines the second number based on the transmission bandwidth and the average bandwidth. In one example, the computing device 103 uses the data stream manager 502 to divide the transmission bandwidth by the average bandwidth, for the purpose of obtaining the second number.

In one embodiment, if the performance monitor 503 has monitored that the capability of the server 105 changes significantly, then the server 105 will notify the data stream manager 502, and redetermine the second number based on the updated capability and restart data transmission based on the new second number.

Returning to FIG. 2, at 240, the computing device 103 causes the target data 102 to be sent from the buffer 104 to the server 105 via the second number of data streams. For example, the computing device 103 notifies the server 105 of the determined second number for sending the target data 102. As shown in FIG. 5, the target data 102 is sent via 3 data streams 505-1, 505-2 and 505-3 (referred to as a data stream 505). The specific process of data transmission is not described here, but data may be sent by any technique that is already known in the art or to be developed in future. Note the numbers of data streams 504 and data streams 505 shown in FIG. 5 are merely for illustration, and the number of data streams 505 may be equal to or larger than that of data streams 504.

Therefore, the present solution may accurately assign the number of data streams for sending data in each backup client where attributes of data and a working state of the server are analyzed. Thereby, unnecessary data streams do not need to be set to process data with a higher duplication rate, but more data streams may be set to process data with a low duplication rate. In this way, the performance of sending performance in the backup client is improved.

Figure 6:
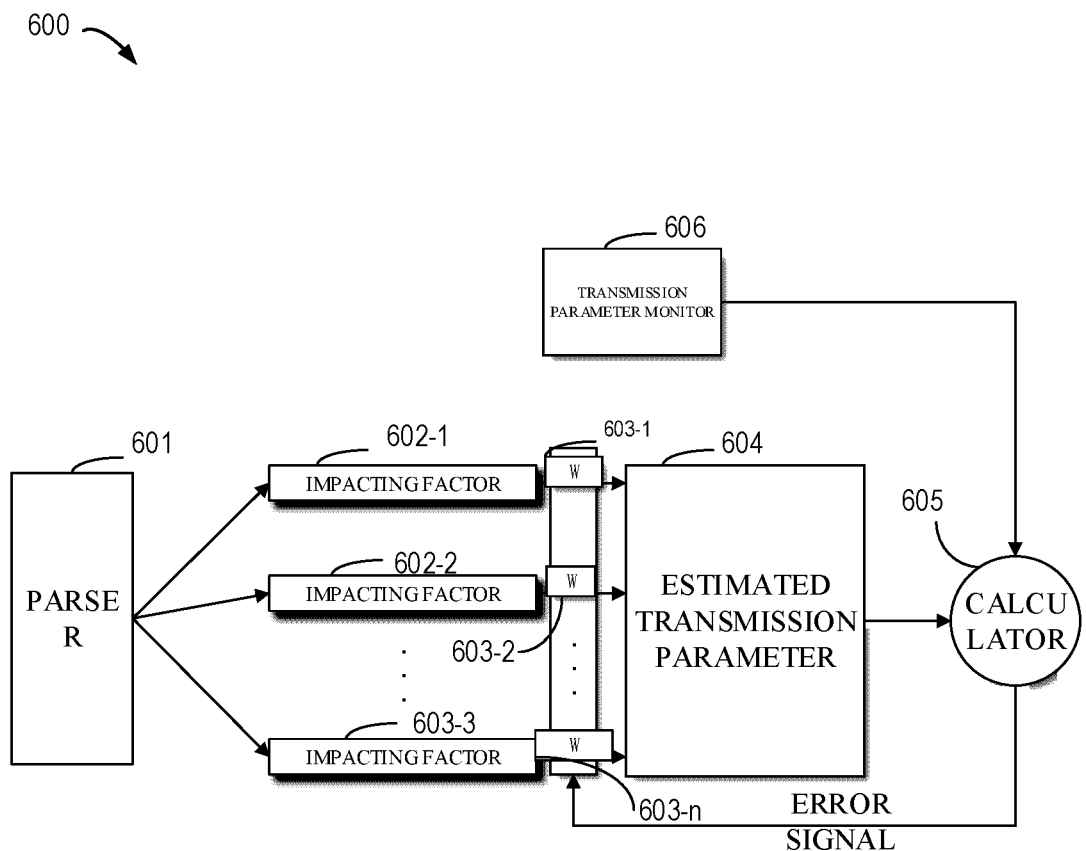
FIG. 6 shows a schematic view of an example of determining a weight for an impacting factor according to embodiments of the present disclosure.

FIG. 6 shows a schematic view of an example of determining a weight for an impacting factor according to embodiments of the present disclosure.

A neural network that comprises a parser 601, a calculator 605 and a transmission parameter monitor 606 as shown in FIG. 6 may be implemented in the machine learning module 501 of the computing device 103 in FIG. 5, which may be a software program or a hardware module.

To train the neural network to obtain weight matrices W603-1, W603-2 . . . W603-$n$ (referred to as a weight matrix W603 below) of different impacting factors 602-1, 602-2 . . . 602-$n$ (referred to as an impacting factor 602 below), the computing device 103 obtains the real transmission parameter of sending data to the buffer 104 via the parameter transmission monitor 606, and uses the real transmission parameter and an estimated transmission parameter to train the neural network.

Assume in the training of number i times, the actual output value of the estimated real transmission parameter 604 is:

$$f(z(i)) = \frac{1}{1+e^{-z(i)}} = \frac{1}{1+e^{(-b-\sum_{k=1}^{m} w_k(i) \times z_k(i))}} \quad \text{Formula (1)}$$

Wherein f(z) is the estimated real transmission parameter 604 for the neural network, whose value is outputted to the calculator 605. In addition, the computing device 103 obtains the real transmission parameter d(z) of sending data to the buffer 104 via the transmission parameter monitor 606 and also outputs it to the calculator 605 for calculating an error signal e(z(i)):

$$e(z(i))=d(z(i))-f(z(i)) \quad \text{Formula (2)}$$

Then, the computing device 103 uses the calculator 605 to train the weight matrix W based on the obtained error signal and a steepest descent method. Assume there are N training samples, and a cost function E(W) is defined for all test cases in the training samples as below:

$$E(W) = \frac{1}{2}\sum_{i=1}^{N} e^2(z(i)) = \frac{1}{2}\sum_{i=1}^{N} (d(z(i)) - f(z(i)))^2 \quad \text{Formula (3)}$$

Next, the computing device 103 uses the calculator 605 to calculate partial derivatives of the cost function E(W):

$$g = \frac{\partial E(W)}{\partial W} = \frac{\partial}{\partial W}\left(\frac{1}{2}\sum_{i=1}^{N}(d(z(i))-f(z(i)))^2\right) = \quad \text{Formula (4)}$$

$$-\sum_{i=1}^{N} e(z(i))\ f(z(i))(1-f(z(i)))$$

The computing device 103 sets a step length n and obtains a matrix value W(i+1) for the next training based on the partial derivatives, wherein g is the partial derivative calculated in Formula (4):

$$W(i+1) = \quad \text{Formula (5)}$$

$$W(i) - ng(i) = W(i) + n\sum_{i=1}^{N} e(z(i))\ f(z(i))(1-f(z(i)))$$

The computing device 103 uses the neural network to repeat this process until the cost function E(W) is small enough, and then the weight matrix W603 is obtained.

Figure 7:
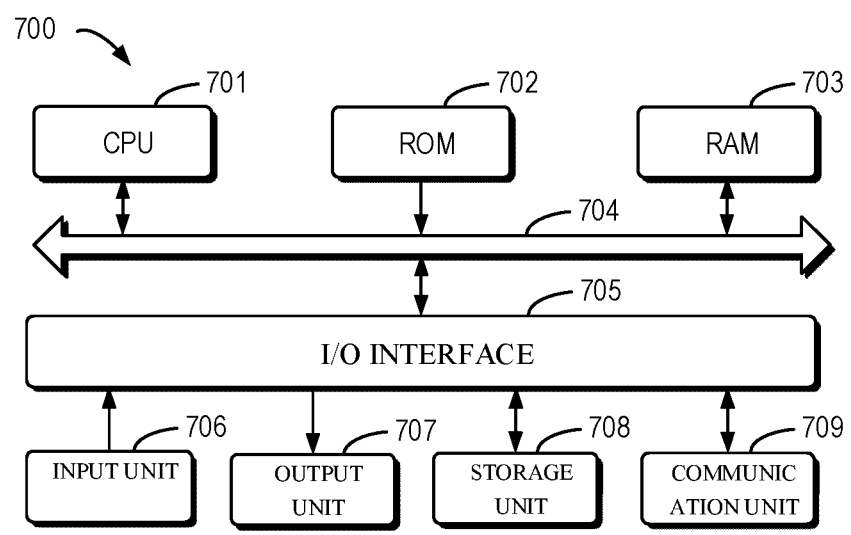
FIG. 7 shows a schematic block diagram of an example device which is applicable to implement embodiments of the present disclosure.

FIG. 7 shows a schematic block diagram of an example device 700 which is applicable to implement embodiments of the present disclosure. For example, the computing device 103 as shown in FIG. 1 may be implemented by the device 700. As depicted, the device 700 includes a central processing unit (CPU) 710, which can execute various suitable actions and processing based on the computer program instructions stored in the read-only memory (ROM) 720 or computer program instructions loaded in the random-access memory (RAM) 730 from a storage unit 780. The RAM 730 can also store all kinds of programs and data required by the operations of the device 700. CPU 710, ROM 720 and RAM 730 are connected to each other via a bus 740. The input/output (I/O) interface 750 is also connected to the bus 804.

A plurality of components in the device 700 are connected to the I/O interface 750, including: an input unit 760, such as a keyboard, mouse and the like; an output unit 770, e.g., various kinds of displays and loudspeakers etc.; a storage unit 780, such as a magnetic disk and optical disk, etc.; and a communication unit 790, such as a network card, modem, wireless transceiver and the like. The communication unit 790 allows the device 700 to exchange information/data with other devices via the computer network, such as Internet, and/or various telecommunication networks.

The above described process and treatment, such as the methods 200, 300 and 400 can also be executed by the processing unit 710. For example, in some embodiments, the methods 200, 300 and 400 can be implemented as a computer software program tangibly included in the machine-readable medium, e.g., the storage unit 780. In some embodiments, the computer program can be partially or fully loaded and/or mounted to the device 700 via ROM 720 and/or the communication unit 790. When the computer program is loaded to the RAM 730 and executed by the CPU 710, one or more steps of the above described methods 200 and 300 can be implemented.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-sent cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to embodiments of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each implementation and technical improvements made in the market by each implementation, or enable others of ordinary skill in the art to understand embodiments of the present disclosure.

We claim:

1. A method of backing up data, comprising:
    determining a first number of data streams for sending target data;
    causing the target data to be sent to a buffer via the first number of data streams;
    determining a second number of data streams for sending the target data from the buffer to a server based on a transmission parameter associated with transmission of the target data to the buffer and a capability of the server for receiving data from the buffer; and
    causing the target data to be sent from the buffer to the server via the second number of data streams.

2. The method of claim 1, wherein determining the first number comprises:
    obtaining an impacting factor associated with the target data;
    determining the transmission parameter based on the impacting factor and a first predetermined number of data streams for sending the target data; and
    in response to the transmission parameter of the target data to be sent dissatisfying a predetermined service level agreement, determining the first number by increasing the first predetermined number.

3. The method of claim 2, wherein the impacting factor comprises at least one of: an average historical data duplication rate, a data increasing or decreasing rate, and a size of data.

4. The method of claim 1, further comprising:
    determining, in raw data, incremental data different from existing data in the server based on an impacting factor associated with the raw data; and
    determining the incremental data as the target data.

5. The method of claim 1, wherein determining the second number comprises:
    determining an average bandwidth of data streams to be received by the server based on the capability of the server;
    determining, based on the transmission parameter, a transmission bandwidth for sending the target data to the buffer; and
    determining the second number based on the transmission bandwidth and the average bandwidth.

6. The method of claim 1, wherein the transmission parameter comprises at least one of: a speed of sending the target data, an average bandwidth of data streams for sending the target data, a packet loss rate of sending the target data, and operating time of the buffer.

7. The method of claim 1, wherein the capability comprises at least one of: the maximum number of data streams received by the server, an average bandwidth of data streams received by the server, a speed of receiving data streams by the server, a load of the server, and operating time of the server.

8. A device for backing up data, comprising:
    at least one processing unit;
    at least one memory, coupled to the at least one processing unit and storing instructions executed by the at least one processing unit, the instructions, when executed by the at least one processing unit, cause the device to perform acts, the acts comprising:
        determining a first number of data streams for sending target data;
        causing the target data to be sent to a buffer via the first number of data streams;
        determining a second number of data streams for sending the target data from the buffer to a server based on a transmission parameter associated with transmission of the target data to the buffer and a capability of the server for receiving data from the buffer; and
        causing the target data to be sent from the buffer to the server via the second number of data streams.

9. The device of claim 8, wherein determining the first number comprises:
    obtaining an impacting factor associated with the target data;
    determining the transmission parameter based on the impacting factor and a first predetermined number of data streams for sending the target data; and
    in response to the transmission parameter of the target data to be sent dissatisfying a predetermined service level agreement, determining the first number by increasing the first predetermined number.

10. The device of claim 9, wherein the impacting factor comprises at least one of: an average historical data duplication rate, a data increasing or decreasing rate, and a size of data.

11. The device of claim 8, further comprising:
    determining, in raw data, incremental data different from existing data in the server based on an impacting factor associated with the raw data; and
    determining the incremental data as the target data.

12. The device of claim 8, wherein determining the second number comprises:
    determining an average bandwidth of data streams to be received by the server based on the capability of the server;
    determining, based on the transmission parameter, a transmission bandwidth for sending the target data to the buffer; and
    determining the second number based on the transmission bandwidth and the average bandwidth.

13. The device of claim 8, wherein the transmission parameter comprises at least one of: a speed of sending the target data, an average bandwidth of data streams for sending the target data, a packet loss rate of sending the target data, and operating time of the buffer.

14. The device of claim 8, wherein the capability comprises at least one of: the maximum number of data streams received by the server, an average bandwidth of data streams received by the server, a speed of receiving data streams by the server, a load of the server, and operating time of the server.

15. A computer program product, tangibly stored on a non-transitory computer-readable medium and comprising machine-executable instructions, which, when executed, cause a machine to perform operations, the operations comprising:
  determining a first number of data streams for sending target data;
  causing the target data to be sent to a buffer via the first number of data streams;
  determining a second number of data streams for sending the target data from the buffer to a server based on a transmission parameter associated with transmission of the target data to the buffer and a capability of the server for receiving data from the buffer; and
  causing the target data to be sent from the buffer to the server via the second number of data streams.

16. The computer program product of claim 15, wherein determining the first number comprises:
  obtaining an impacting factor associated with the target data;
  determining the transmission parameter based on the impacting factor and a first predetermined number of data streams for sending the target data; and
  in response to the transmission parameter of the target data to be sent dissatisfying a predetermined service level agreement, determining the first number by increasing the first predetermined number.

17. The computer program product of claim 16, wherein the impacting factor comprises at least one of: an average historical data duplication rate, a data increasing or decreasing rate, and a size of data.

18. The computer program product of claim 15, wherein the operations further comprise:
  determining, in raw data, incremental data different from existing data in the server based on an impacting factor associated with the raw data; and
  determining the incremental data as the target data.

19. The computer program product of claim 15, wherein determining the second number comprises:
  determining an average bandwidth of data streams to be received by the server based on the capability of the server;
  determining, based on the transmission parameter, a transmission bandwidth for sending the target data to the buffer; and
  determining the second number based on the transmission bandwidth and the average bandwidth.

20. The computer program product of claim 15, wherein the transmission parameter comprises at least one of: a speed of sending the target data, an average bandwidth of data streams for sending the target data, a packet loss rate of sending the target data, and operating time of the buffer.

* * * * *